(12) United States Patent
Voit et al.

(10) Patent No.: US 7,376,828 B1
(45) Date of Patent: May 20, 2008

(54) METHOD AND APPARATUS FOR USING INCOMPLETELY TRUSTED SERVICE PROVIDER POINT-TO-POINT NETWORKS

(75) Inventors: Eric Voit, Bethesda, MD (US); Pratima Sethi, Bangalore (IN); Jan Vilhuber, San Luis Obispo, CA (US)

(73) Assignee: Cisco Technology, Inc., San Jose, CA (US)

( * ) Notice: Subject to any disclaimer, the term of this patent is extended or adjusted under 35 U.S.C. 154(b) by 732 days.

(21) Appl. No.: 10/188,499

(22) Filed: Jul. 1, 2002

(51) Int. Cl.
*H04L 9/00* (2006.01)

(52) U.S. Cl. .......................... 713/153; 713/160; 726/3; 726/15

(58) Field of Classification Search .................. 726/15, 726/3
See application file for complete search history.

(56) References Cited

U.S. PATENT DOCUMENTS

| | | | |
|---|---|---|---|
| 5,918,019 A * | 6/1999 | Valencia ..................... | 709/227 |
| 6,226,751 B1 * | 5/2001 | Arrow et al. ................. | 726/15 |
| 6,938,155 B2 * | 8/2005 | D'Sa et al. ................. | 713/160 |
| 7,055,171 B1 * | 5/2006 | Martin et al. ................. | 726/3 |
| 7,088,714 B2 * | 8/2006 | Athreya et al. ............. | 370/389 |
| 7,174,388 B2 * | 2/2007 | Luciani et al. ............... | 709/238 |
| 2003/0108051 A1 * | 6/2003 | Bryden et al. ......... | 370/395.54 |
| 2003/0110268 A1 * | 6/2003 | Kermarec et al. .......... | 709/227 |
| 2004/0202157 A1 * | 10/2004 | Chase et al. ................. | 370/389 |

OTHER PUBLICATIONS

S. Kent et al., "Security Architecture for the Internet Protocol," IETF RFC 2401, Nov. 1998, pp. 1-66.
Cisco Systems, Inc., "IPSec," Jan. 1997, pp. 1-10.

* cited by examiner

*Primary Examiner*—Emmanuel Moise
*Assistant Examiner*—David J. Pearson
(74) *Attorney, Agent, or Firm*—Hickman Palermo Truong & Becker LLP

(57) ABSTRACT

A method and apparatus for using a service provider network that supports point-to-point channels is disclosed. One or more encryption parameters are associated with a channel from among a set of one or more predefined point-to-point channels provided by the service provider to connect customer points for a customer different than the service provider. Payloads for a particular flow of one or more data packets directed through the channel are encrypted at a first customer point, using the set of encryption parameters associated with the particular channel, to generate a set of one or more encrypted payloads. The encrypted payloads are inserted in the particular flow sent through the channel of the service provider network. The encrypted payloads are decrypted at a second customer point connected to the first customer point by the channel.

15 Claims, 5 Drawing Sheets

METHOD AND APPARATUS FOR USING INCOMPLETELY TRUSTED SERVICE PROVIDER POINT-TO-POINT NETWORKS

FIELD OF THE INVENTION

The present invention generally relates to using point-to-point data communication channels in service provider telecommunication networks. The invention relates more specifically to using point-to-point channels in service provider networks that are not completely trusted by the user.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A point-to-point data communication channel provides a persistent, always-on connection between two or more sites that are connected to a wide area network (WAN). Point-to-point channels are attractive to enterprises with many personnel and data resources at multiple sites, so that resources can be shared among those sites. In addition, point-to-point connections add a level of security because they prevent delivery of traffic to points other than the enterprise sites that can be trusted.

Some independent WAN service providers (SPs) provide point-to-point channels for which a customer enterprise (a "customer") can subscribe. Typically the customer pays the SP for a particular number of channels each supporting a specified level of service between two of the customer's sites. Each channel is associated with a channel identifier.

Point-to-point channels can be formed in both circuit switched and packet switched networks. A circuit switched network devotes all the data carrying capacity ("bandwidth") of a physical medium link to a channel. A packet switched network allows sharing the bandwidth of a physical medium link among several channels. A physical circuit is composed of one or more physical links that are used to connect two customer sites.

Devices attached to a WAN fall into two general categories: data terminating equipment (DTE) that produces or consumes the data transported over the network; and data circuit-terminating equipment (DCE). DTE devices are typically located on the customer premises and are procured by the customer independently of the SP. Example DTE devices include terminals, personal computers, routers and bridges. DCE devices are SP-procured internetworking devices that provide clocking and switching service that actually transmit data through the WAN.

Two DCEs are directly connected by a physical link. A DCE that directly connects to a DTE is a service provider edge (PE) device. The DTE that directly connects to a DCE is a customer edge (CE) device. Some PE devices are physically located on customer premises, even though they are owned and operated by the SP; these are termed PE customer located equipment (PE-CLE).

Frame Relay (FR) is a high-performance packet-switched WAN protocol that provides point-to-point channels using virtual circuits. A virtual circuit is a logical connection created between two customer sites, such as two PE-CLEs, across the FR packet switched network. A virtual circuit is uniquely identified by a data-link connection identifier (DLCI) value. The DLCI values are typically assigned by the SP. Several virtual circuits can be multiplexed into a single physical circuit made up of a series of physical links between SP-procured networking devices. FR typically provisions virtual circuits with bandwidths in multiples of 0.064 Megabits per second (Mbps) up to about 1 Mbps, where a bit is a binary digit and a Megabit is a million bits.

A common implementation of a Frame Relay WAN involves an optical backbone that connects the DCEs of the WAN. An optical PE-CLE is typically located by an SP in the basement of a building that houses one or more customers of the SP. For each customer in the building, an optical cable is run from the PE-CLE to a FR communication processor ("FR box"). The optical cable carries only the channels to which the customer has subscribed. The FR box manages the DLCIs associated with those channels. When data packets arrive at the FR box destined for one of the customer's remote sites, the data packets are inserted into FR data packets with the correct DLCI. The FR data packets are sent on the optical cable to the optical PE-CLE, and from thence to the optical WAN.

For example, the Synchronous Optical Network (SONET) protocol is a standard adopted for optical WANs by many SPs. SONET is capable of transmission rates up to almost 10,000 Mbps, split among up to 192 levels of byte-interleaved synchronous transport signals (STS). Each level of STS is capable of carrying 51.84 Mbps. A signal that carries N levels is called an N level STS (STS-N) or an N level optical carrier (OC-N). In a typical FR implementation, the PE-CLE may handle OC-48 (about 2,488 Mbps) and the cable to the FR box may handle OC-12 signals (about 622 Mbps).

In the typical implementation, the FR box is a DTE connected to the customer's local area network (LAN) inside a customer premises or building. Typically, the FR box is a printed circuit card occupying a slot in a customer's router. The LAN can rely on any LAN protocol. Typically, the LAN uses the Ethernet protocol.

While suitable for many purposes, optical FR boxes suffer some disadvantages. They are expensive, bandwidth is limited, changes in bandwidth require re-provisioning the optical PE-CLE and the FR box and the optical cable connecting the two, and security is less than complete.

At present the cost of an FR router with an OC-12 optical connection is about ten times the cost an Ethernet router. FR channels are limited to bandwidths of 1 Mbps. The cheaper Ethernet devices can handle bandwidths of 10 Mbps, 100 Mbps, and even 1000 Mbps ("Gigabit Ethernet"). FR channels are defined for the whole WAN, so changing the number or bandwidth of the channels involves re-provisioning one or more of the PE-CLEs of the SP, the FR boxes, and perhaps replacing the cable between the PE-CLE and the FR box.

Security is less than complete, so the WAN might not be completely trusted. Much of the backbone of the SP WAN is physically secure, involving buried cable and proprietary equipment. However, in a building housing several customers, the PE-CLE may be accessible by multiple customers and often includes interfaces, like SONET interfaces, that follow an open standard. Compared to other parts of the WAN, it is relatively easy for a non-trusted party to snoop traffic from a customer at the PE-CLE.

To reduce snooping, the PE-CLE is often placed behind locked doors. Other factors that reduce snooping by non-trusted parties include the lack of electromagnetic emissions from optical cable, the limited knowledge of FR protocols among the community of hackers that demonstrate a readiness to snoop, and the expense of the equipment needed to interface with the PE-CLE. However, even if these factors that reduce snooping are completely effective, they do not prevent the SP itself from snooping. A customer is forced to trust the SP. In some circumstances, the customer may prefer not to completely trust the SP. Nonetheless, it is standard practice to assume that point-to-point connections provided by an SP provide sufficient security because the SP prevents traffic from being delivered to points other than the trusted customer sites and the SP is not motivated to snoop.

One approach to alleviate the cost and bandwidth and provisioning limitations of FR networks is to use more Ethernet equipment in the customer location. This can be accomplished by providing an Ethernet interface on the PE-CLE optical device or by replacing the optical device with an Ethernet device that uses as a network backbone multiple segments connected by Ethernet devices.

The Ethernet protocol allows traffic to traverse different segments separated by Ethernet devices by using virtual local area network (VLAN) tags on Ethernet data packets called frames. The VLAN tags allow an SP to assign interfaces on DCEs to logical groups and to communicate among these interfaces on DCEs across multiple LANs as though the interfaces on the DCEs were on a single LAN. Bridges and switches filter destination addresses and forward VLAN frames only to interfaces that serve the VLAN to which the traffic belongs. VLANs also can be used to connect multiple buildings in a metropolitan area WAN.

While advantageous from the perspective of cost, bandwidth and provisioning, use of Ethernet interfaces increases security vulnerability. The extension to Ethernet interfaces does not alleviate the security problems associated with physical control of the PE-CLE or the trustworthiness of the SP. In contrast to optical PE-CLEs, Ethernet cables do emit electromagnetic waves that can be snooped externally. Furthermore, in contrast to the FR protocol, the Ethernet protocol is widely known among the community of hackers who demonstrate a readiness to snoop. In addition, Ethernet cable and PE-CLE interfaces can be tapped with interface equipment, such as hubs, that are inexpensive.

Based on the foregoing, there is a clear need for using incompletely trusted service provider point-to-point networks without suffering the security disadvantages of the existing approaches. In particular, there is a clear need for using higher bandwidth, less expensive Ethernet equipment on service provider point-to-point networks without suffering the security disadvantages of the existing approaches.

SUMMARY OF THE INVENTION

The foregoing needs, and other needs and objects that will become apparent from the following description, are achieved in the present invention, which comprises, in one aspect, a method for using a service provider network that is provided by a service provider and that supports point-to-point channels. The service provider provides a set of one or more predefined point-to-point channels to connect customer points for a customer different than the service provider. The method includes associating a set of one or more encryption parameters with a particular channel of the set of predefined point-to-point channels. Payloads for a particular flow of one or more data packets directed through the particular channel are encrypted at a first customer point using the set of encryption parameters associated with the particular channel to generate a set of one or more encrypted payloads. The set of one or more encrypted payloads are inserted in the particular flow sent through the particular channel of the service provider network.

According to another aspect, a method for using the service provider network that supports point-to-point channels includes associating a set of one or more decryption parameters with a particular channel. Payloads for a particular flow of one or more data packets arriving at a customer point through the particular channel are decrypted to generate a set of one or more decrypted payloads. The payloads are decrypted using the set of decryption parameters associated with the particular channel.

According to another aspect, a method for using a service provider network that is provided by a service provider and that supports point-to-point channels with an Ethernet interface, includes receiving and storing a mapping at a local customer Ethernet device. The local customer Ethernet device belongs to a customer different than the service provider and has a first local Ethernet interface coupled to the service provider network. The mapping associates a service provider channel tag with point-to-point communications to a first remote Ethernet interface of a remote customer Ethernet device. The remote Ethernet interface is coupled to the service provider network. The service provider channel tag is associated with a set of one or more remote customer Ethernet interfaces accessed through the first remote Ethernet interface. A set of one or more encryption parameters is associated with the service provider channel tag. Payloads for a particular flow of one or more Ethernet data packets directed to a particular interface of the set of remote customer Ethernet interfaces are encrypted using the set of encryption parameters associated with the service provider channel tag. A set of one or more encrypted payloads is generated as a result. At the local customer Ethernet device, the service provider channel tag is inserted in a virtual local area network (VLAN) field and the set of one or more encrypted payloads is inserted in a data field of the flow of one or more Ethernet packets sent through the first Ethernet interface to the service provider network.

According to another aspect, a method for using a service provider network that supports point-to-point channels with an Ethernet interface, includes receiving and storing a mapping at a local customer Ethernet device. The local customer Ethernet device belongs to a customer different than the service provider and has a first local Ethernet interface coupled to the service provider network. The mapping associates a service provider channel tag with point-to-point communications to a first remote Ethernet interface of a remote customer Ethernet device. The remote Ethernet interface is connected to the service provider network. The service provider channel tag is associated with a set of one or more remote customer Ethernet interfaces accessed through the first remote Ethernet interface. A set of one or more decryption parameters is associated with the service provider channel tag. A particular flow of one or more Ethernet data packets with the service provider channel tag is received through the first Ethernet interface from a particular remote Ethernet interface of the set of one or more remote customer Ethernet interfaces. Payloads for the particular flow are decrypted using the set of decryption parameters associated with the service provider tag to generate a set of one or more decrypted payloads.

In other aspects, an apparatus, a computer apparatus and a computer readable medium are provided to carry out the foregoing steps.

By encrypting and decrypting packet flows on customer owned equipment using the above techniques, a desired level of security is ensured when using service provider point-to-point networks that are not completely trusted. Service provider point-to-point networks that are not completely trusted include networks that include service provider access boxes in a building shared with non-trusted tenants and service provider access boxes with Ethernet interfaces. The techniques using Ethernet interfaces allow separate channels, with separate levels of service connected to the same Ethernet interface, to be separately encrypted. This capability is not available with conventional point-to-point techniques.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for communicating over incompletely trusted point-to-point networks are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described in sections organized according to the following outline.

List of Acronyms
Operational Context
Structural Overview
Functional Overview
Detailed Example
Hardware Overview
Extensions and Alternatives

LIST OF ACRONYMS

In this description, the following acronyms have the following meanings:

CE—customer edge
DCE—data circuit-terminating equipment
DLCI—data-link connection identifier
DTE—data terminating equipment
FR—Frame Relay
LAN—local area network
Mbps—Megabits per second
OC—optical carrier
OC-N—N level optical carrier
PE—provider edge
PE-CLE—provider edge, customer located equipment
SONET—Synchronous Optical Network
SP—service provider
STS—synchronous transport signals
VLAN—virtual local area network
WAN—wide area network

OPERATIONAL CONTEXT

For purposes of illustrating example embodiments, the service provider (SP) point-to-point network is shown as an Ethernet network using SP-defined virtual local area network (VLAN) tags as channel identifiers. Thus, in these embodiments, the SP channel identifiers are similar to the data-link connection identifier (DLCIs) used in the Frame Relay (FR) protocol. However, embodiments are not limited to Ethernet SP point-to-point networks but can include SP FR networks, including FR networks that use Ethernet interfaces instead of optical interfaces at Provider edge (PE) devices such as PE customer located equipment (PE-CLE). Other embodiments may be used in other SP networks that provide point-to-point channeling, including both circuit switched networks and packet switched networks.

STRUCTURAL OVERVIEW

Figure 1:
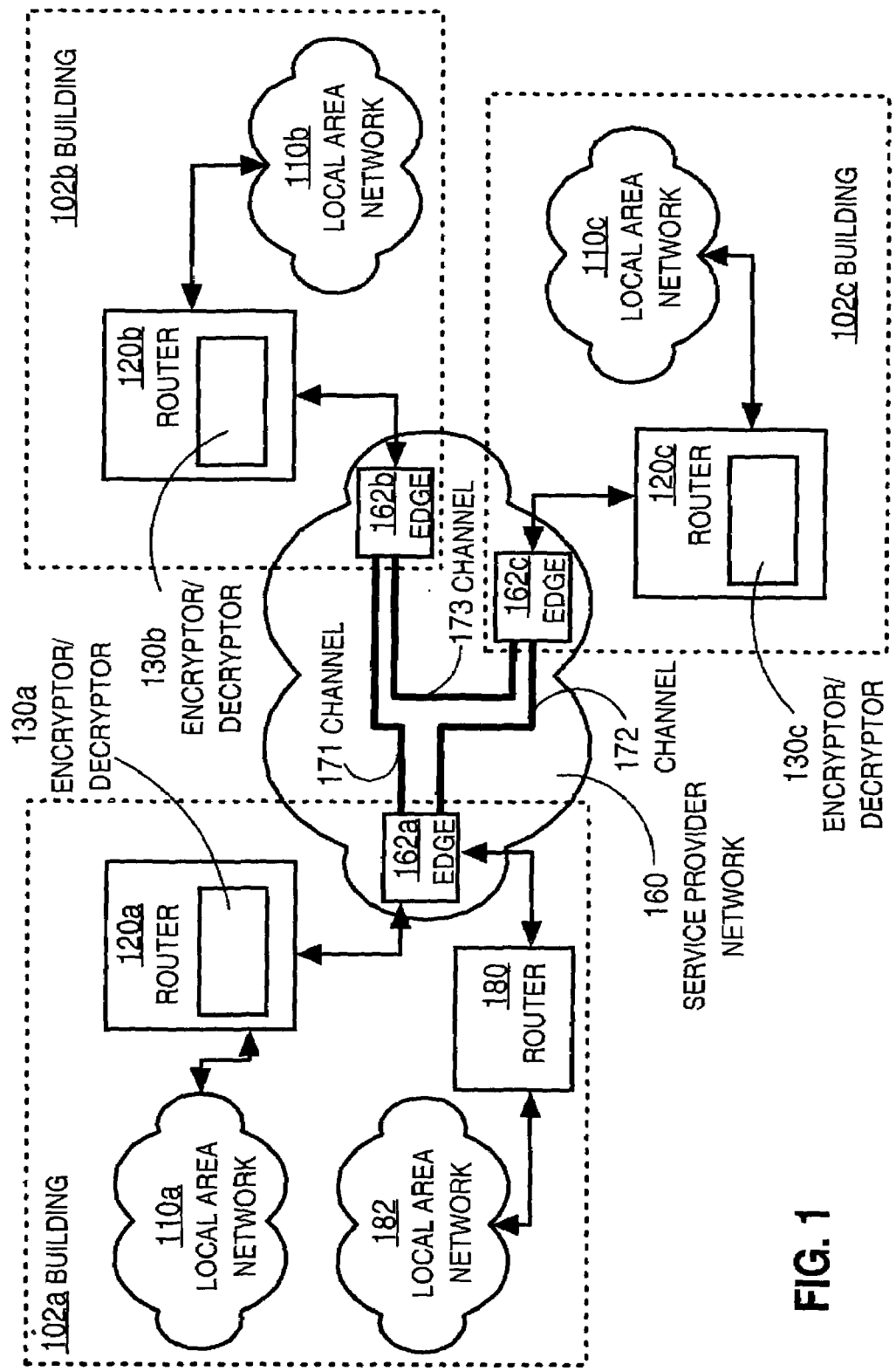
FIG. 1 is a block diagram that illustrates multiple local area networks connected by a service provider network that supports point-to-point channels, according to an embodiment.

FIG. 1 is a block diagram that illustrates multiple local area networks (LANs) connected by a service provider network 160 that supports point-to-point channels, according to an embodiment. The SP network 160 connects data terminating equipment (DTE) procured by several customers and deployed in multiple buildings.

In the illustrated embodiment, three buildings 102a, 102b, 102c in a metropolitan area are supported by SP network 160. The SP network 160 includes provider edge-customer located equipment (PE-CLE) illustrated in FIG. 1 as edges 162a, 162b, 162c, in buildings 102a, 102b, 102c, respectively.

Two customers reside in building 102a. Each customer operates customer procured data terminating equipment (DTE), hereinafter called "customer equipment". One customer, Customer A, operates customer equipment that includes router 120a and local area network (LAN) 110a. A router is DTE that receives data packets on one or more ingress interfaces and sends the data packets to one of a plurality of egress interfaces based on information in the received data packets, routing tables, and other stored information. A LAN is collection of one or more network segments each with one or more hosts, such as computers, printers or file servers, and one or more infrastructure devices such as a bridge, switch or router that are associated with one segment and separate that segment from another.

It is common to consider router 120a as part of a LAN, but for purposes of illustrating that data packets communicated between LAN 110a and SP network 160 pass through router 120a, router 120a is drawn as distinct from the LAN 110a. The router 120a serves as the customer edge (CE) device that couples directly to the SP network 160. In other embodiments, a different device, such as a bridge or a switch, serves as the CE device. In the following descriptions, the LAN 110a is considered to include the CE device, such as router 120a, unless otherwise indicated.

A different customer, customer B, operates customer equipment that includes router 180 and LAN 182. Both customers couple their routers, 120*a*, 180, respectively, directly to SP edge 162*a* in building 102*a*.

Customer A also operates router 120*b* and LAN 110*b* in building 102*b*, and operates router 120*c* and LAN 110*c* in building 102*c*. The routers 120*b*, 120*c* serve as the CE devices in building 102*b*, 102*c*, respectively. In other embodiments, other devices may serve as the CE devices. In the following descriptions, the LAN 110*b* is considered to include router 120*b*, and the LAN 110*c* is considered to include router 120*c*, unless otherwise indicated.

In response to requests from Customer A for channels connecting routers 120*a*, 120*b*, 120*c* in a full mesh, the SP forms channels 171, 172, 173 in SP network 160. Channel 171 is used by edges 162*a*, 162*b* to connect router 120*a* to router 120*b*, thus providing a point-to-point connection between LAN 110*a* and LAN 110*b*. Channel 172 is used by edges 162*a*, 162*c* to connect router 120*a* to router 120*c*, thus providing a point-to-point channel between LAN 110*a* and LAN 110*c*. Channel 173 is used by edges 162*b*, 162*c* to connect router 120*b* to router 120*c*, thus providing a point-to-point channel between LAN 110*b* and LAN 110*c*. LANs 110*a*, 110*b*, 110*c* of Customer A are considered to be located at "points" in these point-to-point channels.

Each channel 171, 172, 173 is identified by an SP-provided channel identification to each of the two CE devices connected by the channel. The SP-provided channel identification need not be the same at the two CE devices. For example, channel 171 may be identified to router 120*a* as having channel identification "45" and may be identified to router 120*b* as having channel identification "32." Router 120*a* uses SP channel identification "45" for all traffic to and from router 120*b*. Router 120*b* uses SP channel identification "32" for all traffic to and from router 120*a*. Both identifications refer to the channel, which is labeled channel 171 in FIG. 1 and FIG. 2. Router 120*a* need not have information that router 120*b* uses "32" to identify channel 171; and, router 120*b* need not have information that router 120*a* uses "45." SP network 160 provides the means to present traffic received from router 120*a* for channel identification "45" to router 120*b* as traffic sent on channel identification "32." For purposes of illustrating embodiments, the possibly multiple identifications for each channel are not required; and, for purposes of illustrating a clear example, each channel is herein identified by its label in FIG. 1 and FIG. 2, e.g., by a channel identification having one of the values "Channel 171," "Channel 172," "Channel 173" for the channels 171, 172, 173, respectively.

For purposes of illustrating a clear example, routers 120*a*, 120*b*, 120*c*, 180 are assumed to include Ethernet interfaces coupled directly to one of the SP edges 162*a*, 162*b*, 162*c* in the same building. In other embodiments, one or more of the routers 162*a*, 162*b*, 162*c*, 180 is coupled directly to an SP edge in the same building with other types of interfaces, such as an optical carrier interface.

FIG. 1 can be used to illustrate security vulnerabilities in some SP networks with point-to-point channels. If an Ethernet interface is used to couple router 120*a* to edge devices 162*a* with a particular Ethernet compliant cable, then anyone with access to building 102*a* and possessing an inexpensive Ethernet device, such as a hub, and a working knowledge of Ethernet, could snoop or corrupt the data packets traversing between router 120*a* and edge device 162*a*. If an optical FR interface is used to couple router 120*a* to edge devices 162*a* with optical cable, then only those with access to building 102*a* and in possession of an expensive optical device, such as a SONET device, and a working knowledge of the less widely known FR protocol, could snoop or corrupt the data packets traversing the optical cable. In either case, agents of Customer B, as well as non-customer residents of building 102*a*, have access to edge device 162*a* or its environs. Also, in either case, the SP can snoop and corrupt the data traversing the edge device 162*a* or channels 171, 172. For any of these reasons, the SP network 160 can be considered an incompletely trusted network by one or more customers, such as by Customer A.

FUNCTIONAL OVERVIEW

In one embodiment, payload data traversing each channel 171, 172, 173 of the SP network 160 is encrypted on customer equipment before communication to the edge devices 162*a*, 162*b*, 162*c* for transmission over SP network 160. Data transmitted over the SP network 160 is decrypted by customer equipment after passing through the edge devices 162*a*, 162*b*, 162*c* to the routers 120*a*, 120*b*, 120*c*. By encrypting and decrypting on customer equipment, the customer need not establish a fully trusted relationship with the SP.

In FIG. 1, encryptor/decryptor processes 130*a*, 130*b*, 130*c* execute on routers 120*a*, 120*b*, 120*c*, respectively, to encrypt outgoing data and decrypt incoming data. In certain embodiments, the encryptor/decryptor processes may be implemented in hardware, such as in an application specific integrated circuit (ASIC), or may be implemented in software, or may be implemented in some combination of hardware and software.

Figure 2:
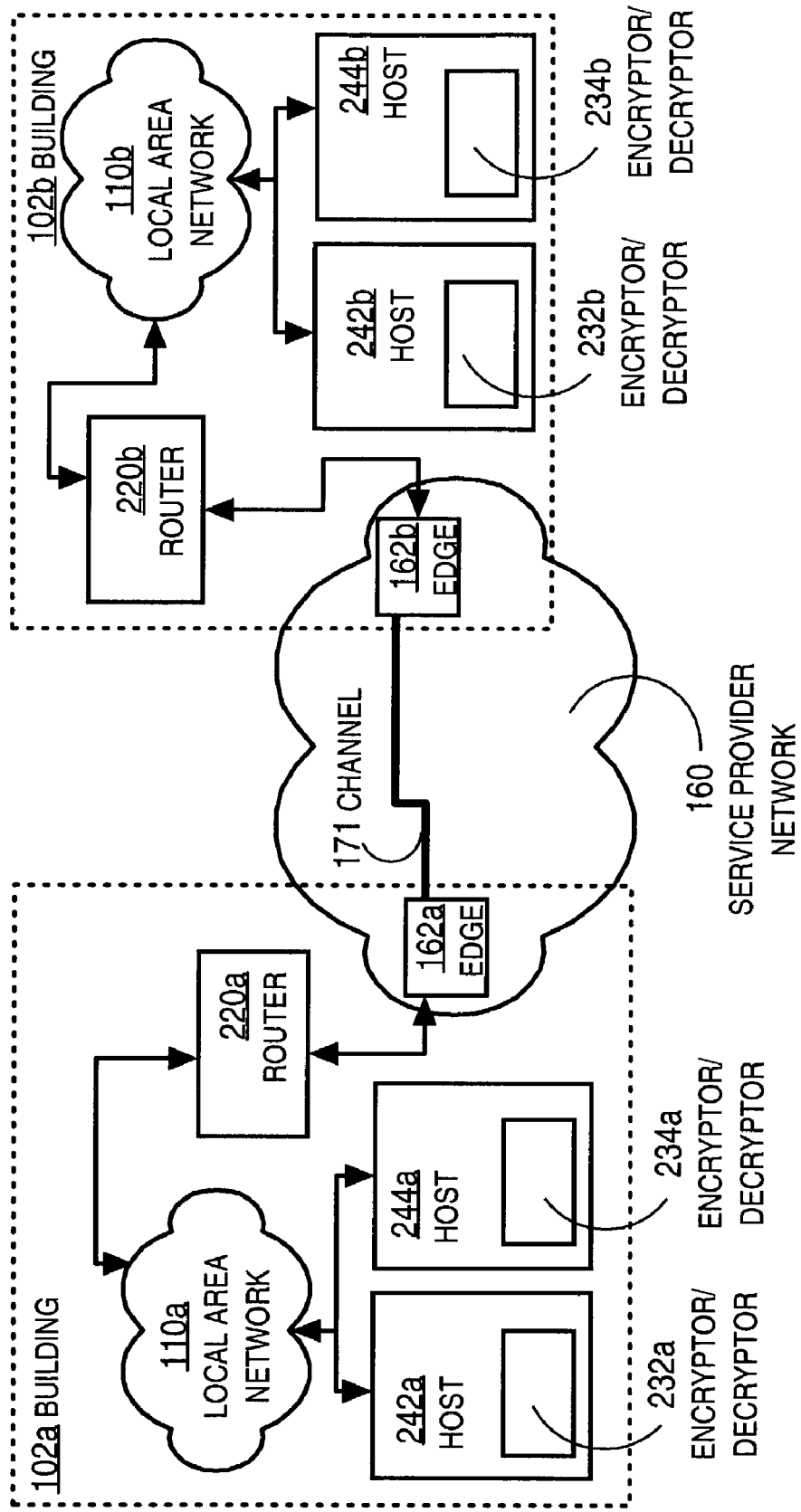
FIG. 2 is a block diagram that illustrates multiple local area networks connected by a service provider network that supports point-to-point channels, according to another embodiment.

FIG. 2 is a block diagram that illustrates multiple LANs 110*a*, 110*b* connected by an SP network 160 that supports point-to-point channels, according to another embodiment. FIG. 2 shows buildings 102*a*, 102*b* from FIG. 1, without the customer equipment of Customer B. FIG. 2 shows hosts 242*a*, 242*b*, 244*a*, 244*b*, which are customer equipment that host application programs that produce or consume data for the network. Such hosts are depicted outside LANs 110*a*, 110*b* for purposes of illustrating a clear example. However, in the following descriptions, the LAN 110*a* is considered to include hosts 242*a*, 244*a*, and the LAN 110*b* is considered to include host 242*b*, 244*b*, unless otherwise indicated.

In the embodiment illustrated in FIG. 2, encryptor/decryptor processes 232*a*, 234*a* execute on hosts 242*a*, 244*a*, respectively, of local network 110*a* to encrypt outgoing data and decrypt incoming data. Similarly, in the embodiment illustrated in FIG. 2, encryptor/decryptor processes 232*b*, 234*b* execute on hosts 242*b*, 244*b*, respectively, of local network 110*b* to encrypt outgoing data and decrypt incoming data. Routers 220*a*, 220*b* that may omit encryptor/decryptor processes replace the routers 120*a*, 120*b*, respectively, with encryptor/decryptor processes depicted in FIG. 1.

DETAILED EXAMPLE

Figure 3:
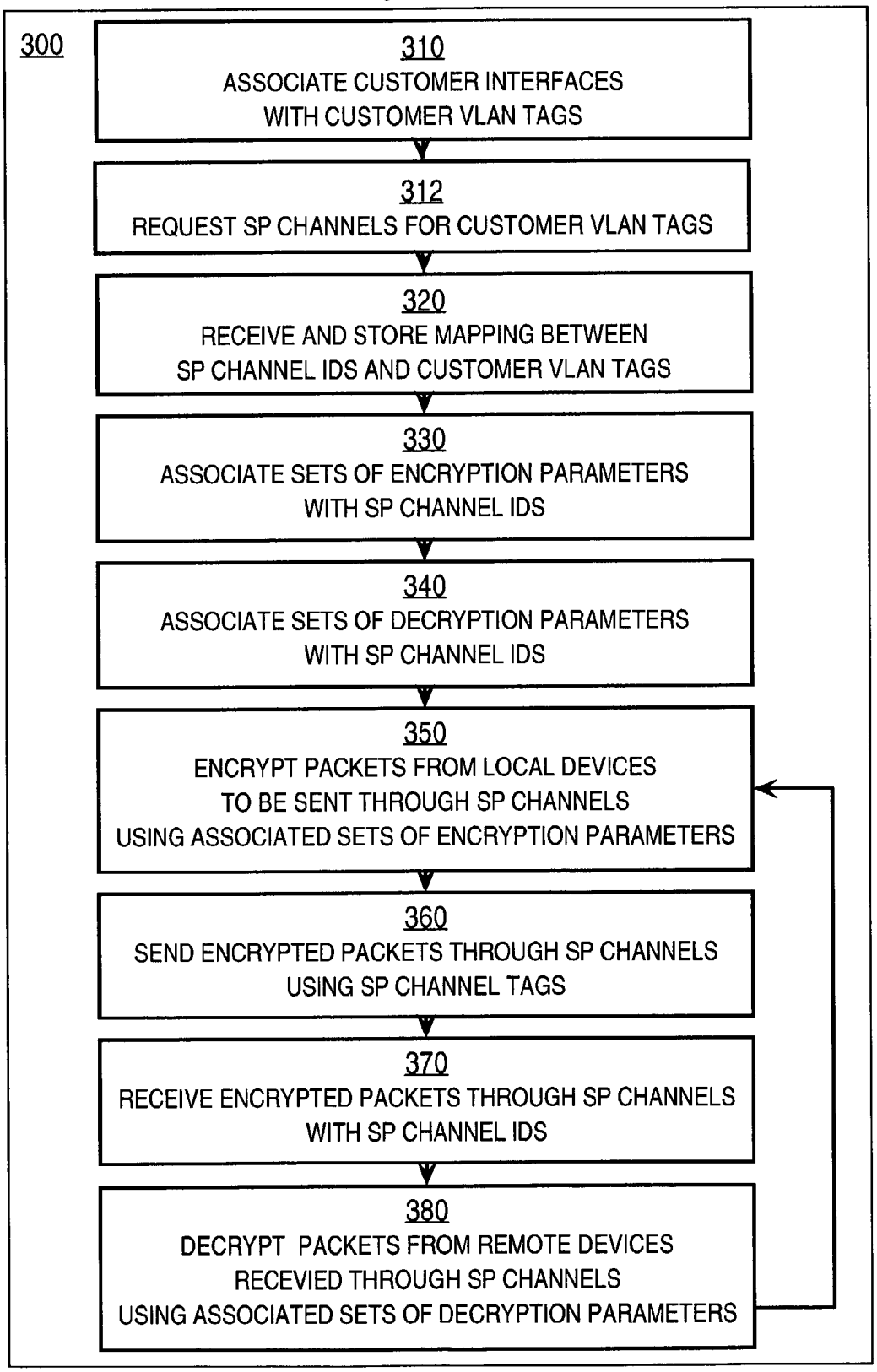
FIG. 3 is a flowchart that illustrates a high level overview of one embodiment of a method for using incompletely trusted service provider point-to-point networks.

FIG. 3 is a flowchart that illustrates a high level overview of one embodiment of a method for using incompletely trusted SP point-to-point networks, such as network 160. Although steps are depicted in FIG. 3 in a particular order, in other embodiments the steps may be performed in a different order or overlapping in time. For example, step 340 may be performed before or overlapping in time with step 330, and steps 370, 380 may be performed before or overlapping in time with steps 350, 360.

For purposes of illustrating the steps of FIG. 3, the SP network 160 is assumed to be an Ethernet network using SP defined VLAN tags as channel identifiers. To distinguish SP-defined VLAN tags from customer defined VLAN tags, in this description SP-defined VLAN tags are termed "channel IDs." For purposes of illustrating a clear example, as described above, each channel ID assumes a value of the channel's label in FIG. 1 and FIG. 2, e.g., assumes one of the values "Channel 171," "Channel 172," or "Channel 173," even though each channel may present different channel IDs at different CE devices.

In step 310, one or more customer defined VLAN tags are associated with at least one Ethernet interface on customer equipment. Step 310 may be omitted when there is no grouping of customer equipment across more than one segment of the LAN, e.g., when there are no customer defined VLANs within LAN 110a.

Ethernet interfaces are used in one of three modes. In access mode (also called "0.1Q Access") an interface belongs to one and only one VLAN. A switch with an access interface accepts Ethernet frames that have no VLAN tags at the access interface and applies a VLAN tag to those frames before passing the frames on to a line that has multiple VLANs. In trunk mode (also called "0.1Q Trunk"), an interface is shared by multiple VLANs. Each Ethernet frame is passed through the switch with its VLAN tag intact. In QinQ mode, several VLANs are aggregated. A switch with a QinQ interface accepts Ethernet frames that have any of several VLAN tags and applies a single aggregate VLAN tag to those frames before passing the frames to a particular line. Aggregate tags set to the SP channel ID can be used to bundle several customer defined VLANs onto the same SP channel. Aggregate tags set to a customer defined VLAN can be used to bundle several SP channels onto the same customer VLAN. For purposes of illustrating a clear example, the interface on each router 120a, 120b, 120c coupled to the SP edge device 162a, 162b, 162c, respectively, is used in trunk mode.

Further, for purposes of illustrating a clear example, it is assumed that during step 310, four VLANs are defined by Customer A. VLAN A involves only Ethernet interfaces on a subset of customer equipment within LAN 110a. VLAN B involves Ethernet interfaces on a subset of customer equipment within LAN 110a and Ethernet interfaces on a subset of customer equipment within LAN 110b. VLAN C involves Ethernet interfaces on a subset of customer equipment within LAN 110a and Ethernet interfaces on a subset of customer equipment within LAN 110c. VLAN D involves Ethernet interfaces on a subset of customer equipment within LAN 110b and Ethernet interfaces on a subset of customer equipment within LAN 110c.

These four VLANs are summarized in the first three columns of Table 1:

TABLE 1

Example customer defined VLANs and mapping to SP channels

| Item number | VLAN tag | Location of interfaces | SP channel ID |
| --- | --- | --- | --- |
| 1 | VLAN A | LAN 110a | — |
| 2 | VLAN B | LANs 110a, 110b | Channel 171 |
| 3 | VLAN C | LANs 110a, 110c | Channel 172 |
| 4 | VLAN D | LANs 110b, 110c | Channel 173 |

In step 312, a request is made to the SP for point-to-point channels for at least one of the VLANs. The VLANs for which SP channels should be requested include at least some of the VLANs that span more than one customer site, but not VLANs that do not span more than one site. For example, an SP channel should not be requested for VLAN A. An SP channel should be requested for VLAN B that spans the sites of LAN 110a and LAN 110b; and an SP channel should be requested for VLAN C that spans the sites of LAN 110a and LAN 110c. For a fully meshed set of SP channels, another SP channel should be requested for VLAN D that spans the sites of LAN 110b and LAN 110c.

In some embodiments, step 312 includes a request for a particular quality of service. For example, if voice is planned for communications on VLAN A and VLAN C, then a quality of service that supports voice should be requested for the SP channel connecting the sites of LAN 110a and LAN 110c.

In step 320, a mapping between SP channel IDs and VLAN tags is received and stored. In some embodiments, the SP channel ID is received for each request from the SP and the associated VLAN tag is associated with the request so that the mapping is indirect. For example, the Channel IDs "Channel 171," "Channel 172," "Channel 173" are received from the SP for the three requests. The Customer A network administrator then associates these channel IDs at a CE with the VLAN tags "VLAN B." "VLAN C," "VLAN D," respectively, that precipitated the requests. The second and fourth columns of Table 1 show this mapping.

The mapping of VLAN tags and SP channel IDs may be stored at the client edge device, for the VLANs involved. For example, the router 120a stores items 2 and 3 of the mapping; the router 120b stores items 2 and 4 of the mapping; and the router 120c stores items 3 and 4 of the mapping. Alternatively, more items of the mapping are stored at each router 120a, 120b, 120c.

In step 330, a set of values for encryption parameters is associated with each SP channel ID. Step 330 may use any method for determining the encryption method to be used, the associated encryption parameters, and values for the encryption parameters. For example, in some encryption schemes, a set of encryption parameters includes a modulus and two prime factors of the modulus as well as a public key for encrypting data sent to a particular destination.

In some embodiments, a single set of values for the encryption parameters is associated with each SP channel. In other embodiments, multiple sets of values for the encryption parameters are associated with each of one or more SP channels.

In embodiments with one set of encryption parameter values for each SP channel, the values may be stored on a router coupled to the SP network. For example, the values may be stored with the encryptor/decryptor processors 130a, 130b, 130c on routers 120a, 120b, 120c, respectively.

In embodiments that associate multiple sets of encryption parameter values, a different set may be associated with each interface in a VLAN or with each VLAN in an aggregate VLAN or with each pair of interfaces in a VLAN or aggregate VLAN. In such embodiments, the values of each set of encryption parameter values may be stored either on the router coupled to the SP network, or on the device that has the interface associated with the set. For example, two sets of encryption parameter values associated with SP channel 171 may be stored with the encryptor/decryptor processors 232a, 234a on hosts 242a, 244b, respectively, shown in FIG. 2. In such embodiments, the set of parameters may include the address of the sending interface or the address of the receiving interface or both. For purposes of illustration, one set of encryption parameter values is assumed to be stored for each SP channel.

In step 340, a set of values for decryption parameters is associated with each SP channel. Any method for determining the decryption method to be used, the associated decryption parameters, and values for the decryption parameters may be employed.

In some embodiments, a single set of values for the decryption parameters is associated with each SP channel. Alternatively, multiple sets of values for the decryption parameters are associated with each of one or more SP channels. In some embodiments, the values for each set of the decryption parameters are stored with the values for the set of encryption parameters, as described above. In embodiments with more than one set of decryption parameter values for one SP channel, the set of parameters may include the address of the sending interface or the address of the receiving interface or both. For purposes of illustration, it is assumed that one set of decryption parameter values is stored for each SP channel.

In step 350, data from Ethernet packets that originate locally and that are destined for remote Ethernet interfaces are encrypted using the encryption parameter values associated with the SP channel associated with the VLAN. This encryption may be performed on the router coupled to the SP network, such as by encryptor/decryptor 130a on router 120a. In embodiments with more than one set of encryption parameter values associated with the SP channel, the values used are those associated with the address of the source of the data packets, or the receiver of the data packets, or a source-receiver pair. This encryption may be performed on the device that is the source of the data packets, such as by encryptor/decryptor 232a on host 242a.

In step 360, the SP channel ID is placed in the VLAN tag field of each Ethernet data packet, called a frame, in a data flow of one or more frames, and the encrypted data is inserted in the flow.

Any protocol for sending encrypted data may be used. For example, the IPSec protocol may be used to set up virtual private networks (VPNs) on the Internet using Internet Protocol (IP). IPSec is an open standard protocol for secure data transfer over the Internet as described in Request For Comments (RFC) 2401, among others, available at the time of this writing on the World Wide Web (www) at domain ietf.org. An IPsec packet includes an IPsec header, a first ciphertext section of variable length containing the data being sent and the transport protocol identifying the process to receive the data, and a second ciphertext section of fixed length, called a message authentication code.

Figure 4:
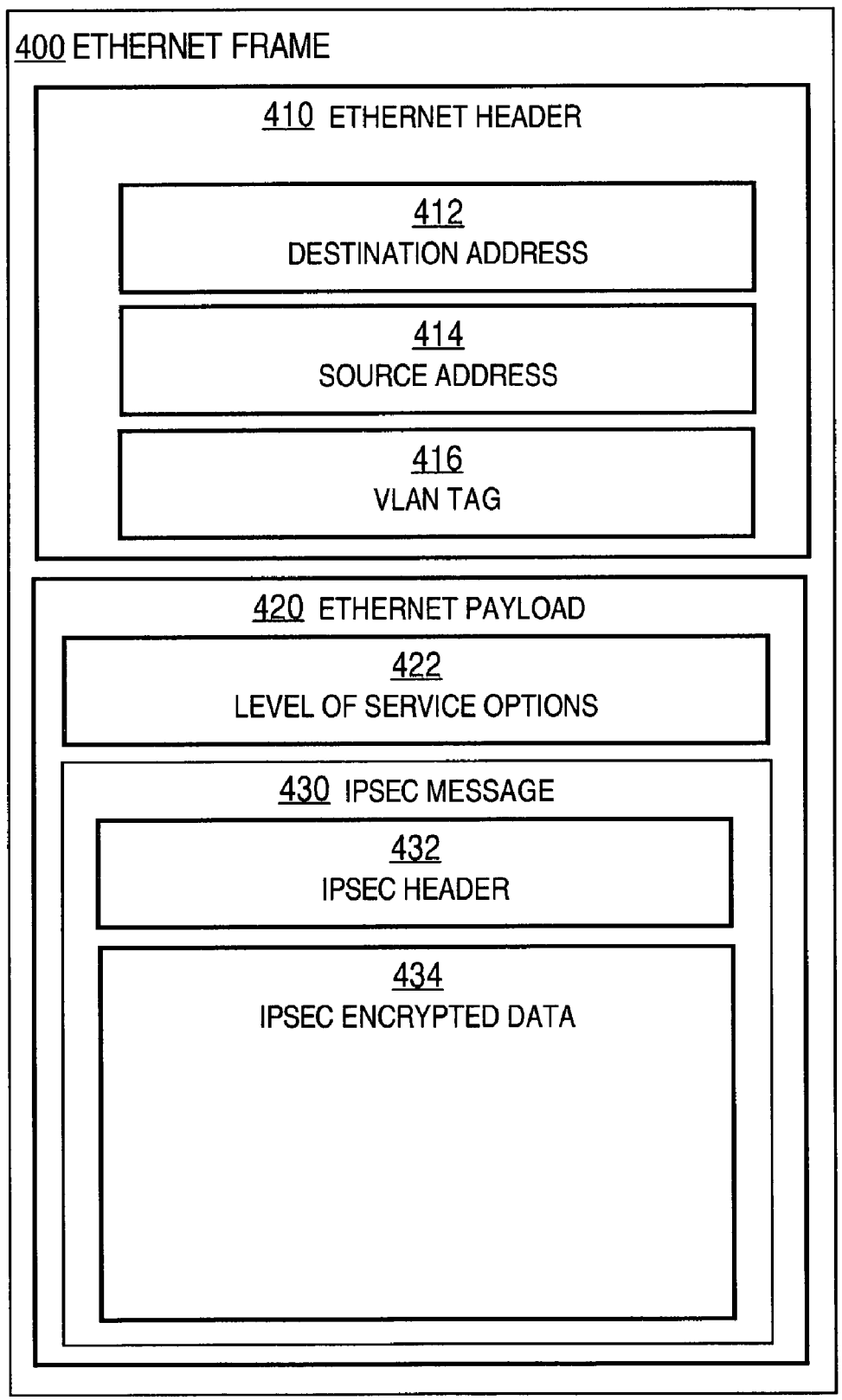
FIG. 4 is a block diagram that illustrates an Ethernet frame passed to an incompletely trusted point-to-point network.

FIG. 4 is a block diagram that illustrates an Ethernet frame 400 passed to an incompletely trusted point-to-point network during step 360, according to an embodiment. The Ethernet frame 400 is a data packet that includes a conventional Ethernet header 410 and an Ethernet payload 420. The Ethernet header includes a field for the Ethernet destination address 412, the Ethernet source address 414 and a VLAN tag 416, among other fields, well known in the art. The destination address in field 412 contains the MAC number for the interface to which the packet is delivered. A router determines which VLAN is associated with this destination. For example, for a frame originating in LAN 110a, router 120a determines that the destination is on VLAN B. The router then places into the VLAN tag field 416, the SP channel ID associated with VLAN B. As can be seen in Table 1, the associated SP channel ID is Channel 171. Thus router 120a inserts the SP channel ID "Channel 171" into the VLAN tag field 416.

The Ethernet payload includes options for quality of service subscribed to in field 422. For example, field 422 specifies a class of service (CoS) differential service code point (DSCP) that supports voice data. The SP uses the CoS/DSCP information in the field 422 to prioritize the flow of these frames across the WAN backbone. To make the information available to the SP, the field 422 is not encrypted, and is therefore located outside any encrypted payload data.

The level of service options field 422 is followed by the IPSec message 430. The IPSec message 430 includes an IPSec header 432 and IPSec encrypted data 434, also called "ciphertext." The ciphertext in field 434 is formed according to the values of the encryption parameters associated with the frame. The association can be directly with the IP channel, or indirectly with the IP channel through association with the particular destination or source on the VLAN, or both. A VLAN is associated with an IP channel by the mapping, such as shown in Table 1.

An Ethernet frame, like frame 400, is sent to the SP network 160 during step 360 by a router or other DTE coupled to the SP network 160, such as router 120a.

In step 370, an Ethernet frame, like frame 400, is received from the SP network at a router or other DTE coupled to the SP network 160, such as router 120b.

In step 380, data from Ethernet packets that originate remotely and that are destined for local Ethernet interfaces are decrypted using the decryption parameter values associated with the SP channel. As described, above the association can be directly with the IP channel, or indirectly with the IP channel through association with the particular destination or source on the VLAN, or both. A VLAN is associated with an IP channel by the mapping, such as that of Table 1.

The decryption may be performed on the router coupled to the SP network, such as by encryptor/decryptor 130b on router 120b. In embodiments with more than one set of decryption parameter values associated with the SP channel, the values used are those associated with the address of the source of the data packets, or the receiver of the data packets, or the unique pair of source and receiver. This decryption may be performed on the device that is the recipient of the data packets, such as by encryptor/decryptor 232b on host 242b.

The arrow pointing from step 380 to step 350 indicates that the routers 120a, 120b, 120c continue to send Ethernet frames with encrypted payloads and to receive Ethernet frames with encrypted payloads.

The approaches described herein allow many different IPSec data flows from a single physical interface coupled to the SP network. At least one IPSec data flow is allowed for each VLAN that passes through the interface. This capability is not available in conventional systems that use a single IPSec flow for any one interface.

HARDWARE OVERVIEW

Figure 5:
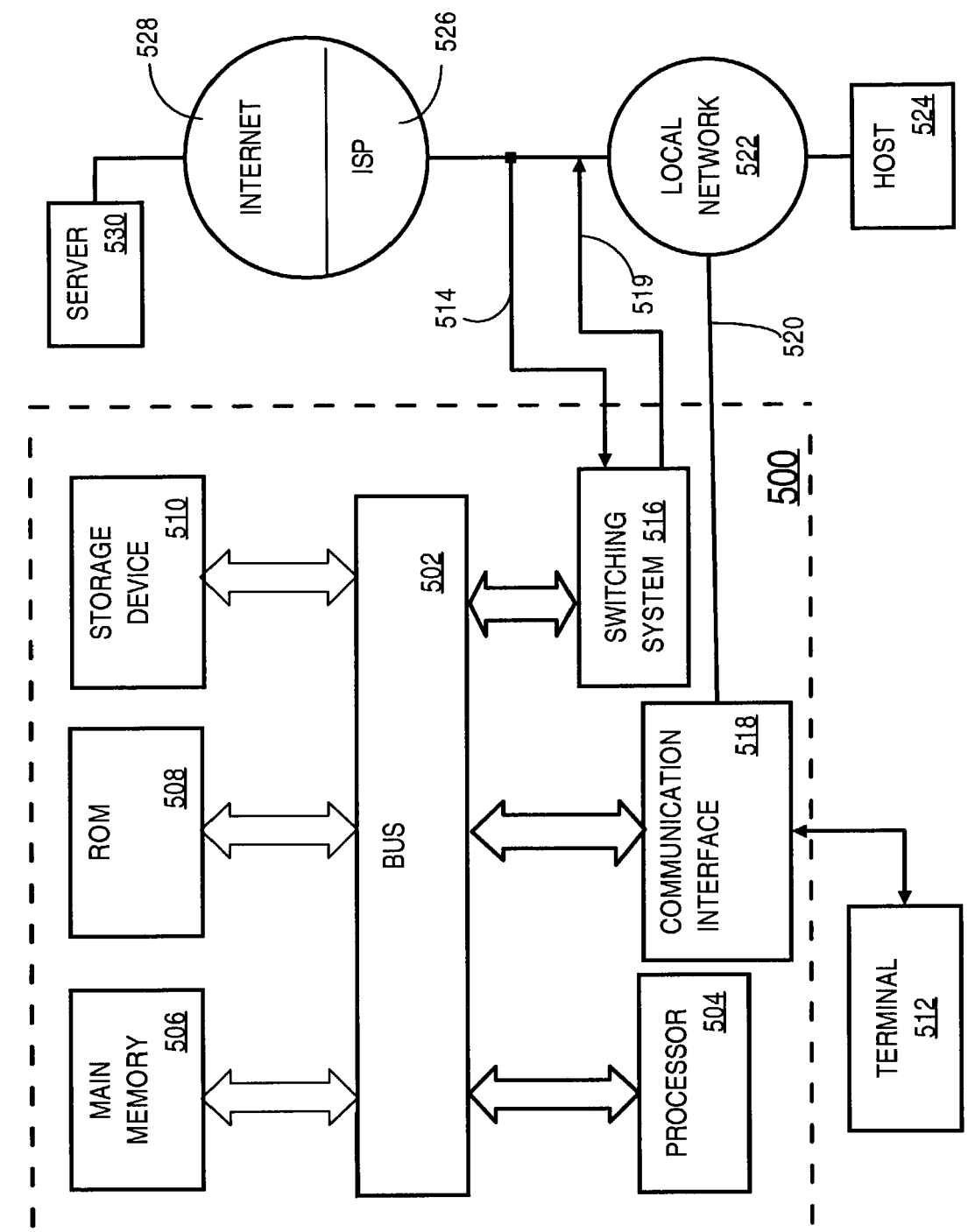
FIG. 5 is a block diagram that illustrates a computer system router upon which an embodiment may be implemented.

FIG. 5 is a block diagram that illustrates a computer system 500 upon which an embodiment may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. In some embodiments, interface 518 is a conventional serial interface such as an RS-232 or RS-422 interface. An external terminal 512 or other computer system connects to the computer system 500 and provides commands to it using the interface 518. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

Embodiments are related to the use of computer system 500 for network communications over an incompletely trusted service provider point-to-point network. According to one embodiment, network communications are provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with certain embodiments, one such downloaded application provides for network communications as described herein.

The received code may be executed by processor 504 as it is received, and/or stored in storage device 510, or other non-volatile storage for later execution. In this manner, computer system 500 may obtain application code in the form of a carrier wave.

EXTENSIONS AND ALTERNATIVES

In the foregoing specification, the invention has been described with reference to specific embodiments thereof. However, it will be evident that various modifications and changes may be made thereto without departing from the broader spirit and scope of the invention. The specification and drawings are, accordingly, to be regarded in an illustrative rather than a restrictive sense.

What is claimed is:

1. A method for using a service provider network that is provided by a service provider and that supports point-to-point channels between Ethernet interfaces that are coupled to the service provider network, the method comprising the steps of:
    requesting a service provider channel tag for one or more virtual local area networks (VLANs), wherein each of the one or more VLANs is associated with a customer defined VLAN tag and wherein the service provider channel tag is a service provider defined VLAN tag;
    receiving and storing, at a local customer Ethernet device that belongs to a customer different than the service provider and that has a first local Ethernet interface coupled to the service provider network, a mapping that associates the service provider channel tag with point-to-point communications from the first local Ethernet interface to a first remote Ethernet interface of a remote customer Ethernet device, which first remote Ethernet interface is coupled to the service provider network;
    associating the service provider channel tag with a set of one or more remote customer Ethernet interfaces accessed through the first remote Ethernet interface;
    associating a set of one or more encryption parameters with the service provider channel tag;
    encrypting payloads for a flow of one or more Ethernet packets directed to a particular Ethernet interface of the set of one or more remote customer Ethernet interfaces using the set of encryption parameters associated with the service provider channel tag to generate a set of one or more encrypted payloads; and
    inserting, at the local customer Ethernet device, the service provider channel tag in a VLAN field in an Ethernet header of each Ethernet packet in the flow of one or more Ethernet packets and an encrypted payload in the set of one or more encrypted payloads in a data field of each Ethernet packet in the flow of one or more Ethernet packets sent through the first local Ethernet interface to the service provider network.

2. The method as recited in claim 1, wherein,
    said step of associating the service provider channel tag with the set of one or more remote customer Ethernet interfaces is performed at the first local customer Ethernet device;
    said step of associating the set of one or more encryption parameters with the service provider channel tag is performed at the first local customer Ethernet device; and
    said step of encrypting the payloads is performed at a second local customer Ethernet device.

3. The method as recited in claim 1, wherein,
    said step of associating the set of one or more encryption parameters comprises associating, at a second local customer Ethernet device not coupled directly to the service provider network, the set of one or more encryption parameters with a subset of the set of one or more remote Ethernet interfaces, which subset includes the first Ethernet interface; and
    said step of encrypting the payloads is performed by encrypting the payloads at the second local customer Ethernet device.

4. The method as recited in claim 1, wherein
    the encryption parameters are for the Internet Protocol security algorithm (IPSec); and
    said step of inserting an encrypted payload in the set of one or more encrypted payloads in a data field of each Ethernet packet in the flow of one or more Ethernet packets includes inserting an IPSec header in a data field of each Ethernet packet in the flow of one or more Ethernet packets based on the associated set of encryption parameters.

5. The method as recited in claim 1, further comprising the step of sending a request to a service provider for a particular level of service for point-to-point communications to the first remote Ethernet interfaces, which request causes the flow of one or more Ethernet packets having the service provider channel tag in the VLAN field to receive the particular level of service.

6. An apparatus for using a service provider network that is provided by a service provider and that supports point-to-point channels between Ethernet interfaces that are coupled to the service provider network, comprising:
    means for requesting a service provider channel tag for one or more virtual local area networks (VLANs), wherein each of the one or more VLANs is associated with a customer defined VLAN tag and wherein the service provider channel tag is a service provider defined VLAN tag;
    means for receiving and storing, at a local customer Ethernet device that belongs to a customer different than the service provider and that has a first local Ethernet interface coupled to the service provider network, a mapping that associates the service provider channel tag with point-to-point communications from the first local Ethernet interface to a first remote Ethernet interface of a remote customer Ethernet device, which first remote Ethernet interface is coupled to the service provider network, wherein the service provider channel tag is received from and defined by the service provider network;
    means for associating the service provider channel tag with a set of one or more remote customer Ethernet interfaces accessed through the first remote Ethernet interface;
    means for associating a set of one or more encryption parameters with the service provider channel tag;
    means for encrypting payloads for a flow of one or more Ethernet packets directed to a particular Ethernet interface of the set of one or more remote customer Ethernet interfaces using the set of encryption parameters associated with the service provider channel tag to generate a set of one or more encrypted payloads; and
    means for inserting, at the local customer Ethernet device, the service provider channel tag in a VLAN field in an Ethernet header of each Ethernet packet in the flow of one or more Ethernet packets and an encrypted payload in the set of one or more encrypted payloads in a data field of each Ethernet packet in the flow of one or more Ethernet packets sent through the first local Ethernet interface to the service provider network;
    wherein the set of one or more remote Ethernet interfaces and a set of one or more local Ethernet interfaces are included in a customer virtual private network (VPN) having a customer VLAN tag.

7. An apparatus as recited in claim 6, wherein,
said means for associating the service provider channel tag with the set of one or more remote customer data-link layer interfaces is located at the first local customer Ethernet device;
said means for associating the set of one or more encryption parameters with the service provider channel tag is located at the first local customer Ethernet device; and
said means for encrypting the payloads is located at a second local customer Ethernet device.

8. An apparatus as recited in claim 6, wherein,
said means for associating the set of one or more encryption parameters comprises means for associating, at a second local customer Ethernet device not coupled directly to the service provider network, the set of one or more encryption parameters with a subset of the set of one or more remote Ethernet interfaces, which subset includes the first Ethernet interface; and
said means for encrypting the payloads performs encrypting the payloads at the second local customer Ethernet device.

9. An apparatus as recited in claim 6, wherein
the encryption parameters are for the Internet Protocol security algorithm (IPSec); and
said means for inserting an encrypted payload in the set of one or more encrypted payloads in a data field of each Ethernet packet in the flow of one or more Ethernet packets includes inserting an IPSec header in a data field of each Ethernet packet in the flow of one or more Ethernet packets based on the associated set of encryption parameters.

10. An apparatus as recited in claim 6, further comprising means for sending a request to a service provider for a particular level of service for point-to-point communications to the first remote Ethernet interfaces, which request causes the flow of one or more Ethernet packets having the service provider channel tag in the VLAN field to receive the particular level of service.

11. An apparatus for using a service provider network that is provided by a service provider and that supports point-to-point channels between customer Ethernet interfaces, comprising:
  a local customer Ethernet device that belongs to a customer different than the service provider and that has a local Ethernet interface coupled to the service provider network for sending thereto one or more packet flows;
  a processor;
  one or more stored sequences of instructions which, when executed by the processor, cause the processor to carry out the steps of:
    requesting a service provider channel tag for one or more virtual local area networks (VLANs), wherein each of the one or more VLANs is associated with a customer defined VLAN tag and wherein the service provider channel tag is a service provider defined VLAN tag;
    receiving and storing, at the local customer Ethernet device, a mapping that associates the service provider channel tag with point-to-point communications from the first local Ethernet interface to a first remote Ethernet interface of a remote customer Ethernet device, which first remote Ethernet interface is coupled to the service provider network;
    associating the service provider channel tag with a set of one or more remote customer Ethernet interfaces accessed through the first remote Ethernet interface;
    associating a set of one or more encryption parameters with the service provider channel tag;
    encrypting payloads for a flow of one or more Ethernet packets directed to a particular Ethernet interface of the set of one or more remote customer Ethernet interfaces using the set of encryption parameters associated with the service provider channel tag to generate a set of one or more encrypted payloads; and
    inserting, at the local customer Ethernet device, the service provider channel tag in a VLAN field in an Ethernet header of each Ethernet packet in the flow of one or more Ethernet packets and an encrypted payload in the set of one or more encrypted payloads in a data field of each Ethernet packet in the flow of one or more Ethernet packets sent through the first local Ethernet interface to the service provider network.

12. An apparatus as recited in claim 11, wherein:
said instructions for performing the step of associating the service provider channel tag with the set of one or more remote customer Ethernet interfaces is performed at the first local customer Ethernet device;
said instructions for performing the step of associating the set of one or more encryption parameters with the service provider channel tag is performed at the first local customer Ethernet device; and
said instructions for performing the step of encrypting the payloads is performed at a second local customer Ethernet device.

13. An apparatus as recited in claim 11, wherein:
said instructions for performing the step of associating the set of one or more encryption parameters comprises one or more instructions which when executed perform associating, at a second local customer Ethernet device not coupled directly to the service provider network, the set of one or more encryption parameters with a subset of the set of one or more remote Ethernet interfaces, which subset includes the first Ethernet interface; and
said instructions for performing the step of encrypting the payloads is performed by encrypting the payloads at the second local customer Ethernet device.

14. An apparatus as recited in claim 11, wherein
the encryption parameters are for the Internet Protocol security algorithm (IPSec); and
said instructions for performing the step of inserting an encrypted payload in the set of one or more encrypted payloads in a data field of each Ethernet packet in the flow of one or more Ethernet packets includes inserting an IPSec header in a data field of each Ethernet packet in the flow of one or more Ethernet packets based on the associated set of encryption parameters.

15. An apparatus as recited in claim 11, further comprising one or more instructions which when executed perform the step of sending a request to a service provider for a particular level of service for point-to-point communications to the first remote Ethernet interfaces, which request causes the flow of one or more Ethernet packets having the service provider channel tag in the VLAN field to receive the particular level of service.

* * * * *